(12) United States Patent
Leblond et al.

(10) Patent No.: US 9,116,162 B2
(45) Date of Patent: Aug. 25, 2015

(54) PROBE FOR MEASURING THE TOTAL PRESSURE OF A FLOW AND METHOD FOR IMPLEMENTING THE PROBE

(71) Applicant: THALES, Neuilly-sur-Seine (FR)

(72) Inventors: Henri Leblond, Versailles (FR); Yves Jaulain, Scorbe Clairvaux (FR); Jean-Philippe Pineau, Landes le Gaulois (FR)

(73) Assignee: THALES, Neuilly sur Seine (FR)

( * ) Notice: Subject to any disclaimer, the term of this patent is extended or adjusted under 35 U.S.C. 154(b) by 156 days.

(21) Appl. No.: 13/708,970

(22) Filed: Dec. 8, 2012

(65) Prior Publication Data

US 2013/0145862 A1 Jun. 13, 2013

(30) Foreign Application Priority Data

Dec. 9, 2011 (FR) ...................................... 11 03779

(51) Int. Cl.
  *G01P 13/00* (2006.01)
  *G01P 5/165* (2006.01)
  *G01P 5/10* (2006.01)

(52) U.S. Cl.
  CPC .. *G01P 5/165* (2013.01); *G01P 5/10* (2013.01)

(58) Field of Classification Search
  None
  See application file for complete search history.

(56) References Cited

U.S. PATENT DOCUMENTS

| | | | |
|---|---|---|---|
| 4,680,962 A | 7/1987 | Durbin | |
| 5,025,661 A * | 6/1991 | McCormack | ................... 73/180 |
| 5,257,536 A | 11/1993 | Beigbeder et al. | |
| 5,731,507 A * | 3/1998 | Hagen et al. | .................... 73/182 |
| 2003/0051546 A1* | 3/2003 | Collot et al. | .............. 73/170.02 |
| 2004/0237641 A1* | 12/2004 | Hanson et al. | ............. 73/170.02 |
| 2004/0255665 A1* | 12/2004 | Choisnet | ..................... 73/178 R |
| 2006/0237415 A1 | 10/2006 | Choisnet | |
| 2012/0118037 A1* | 5/2012 | Leblond et al. | ................ 73/1.25 |
| 2012/0192569 A1* | 8/2012 | Kamp et al. | ..................... 60/785 |
| 2013/0145862 A1* | 6/2013 | Leblond et al. | ............ 73/861.68 |
| 2014/0020479 A1* | 1/2014 | Barbou et al. | ............. 73/861.65 |

FOREIGN PATENT DOCUMENTS

| | | |
|---|---|---|
| EP | 1997731 A2 | 12/2008 |
| FR | 2665539 A1 | 2/1992 |
| FR | 2726148 A1 | 4/1996 |
| FR | 2849339 A1 | 6/2004 |
| GB | 502060 | 3/1939 |
| GB | 867675 | 5/1961 |

* cited by examiner

*Primary Examiner* — Andre Allen

(74) *Attorney, Agent, or Firm* — Baker and Hostetler LLP

(57) ABSTRACT

A probe for measuring the total pressure of a flow and a method for implementing the probe is provided. The probe is intended to be fitted in an aircraft. The probe comprises a Pitot tube and means for reheating the probe assembly. The probe also comprises means for measuring a local temperature of regions of the Pitot tube likely to accumulate particles conveyed by the flow independently of the means for determining the average temperature of the probe. If the temperature delivered by the means for measuring a local temperature of regions of the Pitot tube likely to accumulate particles conveyed by the flow is less than the first reference temperature, then an additional reheating of regions of the Pitot tube likely to accumulate particles conveyed by the flow is triggered.

16 Claims, 2 Drawing Sheets

PROBE FOR MEASURING THE TOTAL PRESSURE OF A FLOW AND METHOD FOR IMPLEMENTING THE PROBE

CROSS-REFERENCE TO RELATED APPLICATION

This application claims priority to foreign French patent application No. FR 1103779, filed on Dec. 9, 2011, the disclosure of which is incorporated by reference in its entirety.

FIELD OF THE INVENTION

The invention relates to a probe for measuring the total pressure of a flow and a method for implementing the probe.

BACKGROUND

Piloting any aircraft requires a knowledge of its speed relative to the air, that is to say, to the relative wind. This speed is determined using probes for measuring the static pressure Ps and the total pressure Pt, and sensors for measuring the angle of incidence $\alpha$ and the angle of slideslip $\beta$. $\alpha$ and $\beta$ provide the direction of the speed vector in a reference system, or coordinate system, linked to the aircraft and Pt−Ps provides the modulus of this speed vector. The four aerodynamic parameters therefore make it possible to determine the speed vector of any aircraft, such as, for example, an aeroplane or a helicopter.

The measurement of the total pressure Pt is usually done when using a tube called the Pitot tube. This is a tube that is open at one of its ends and obstructed at the other. The open end of the tube roughly faces the flow.

The stream of air situated upstream of the tube is progressively slowed down to almost zero speed at the tube inlet. The slowing down of the air speed increases the air pressure. This increased pressure forms the total pressure Pt of the air flow. Inside the Pitot tube, the prevailing air pressure is measured.

To be able to function under wet or icing conditions, this Pitot tube is electrically reheated. The reheating prevents the tube from being obstructed by ice, during flights in icing conditions. This tube is provided with one or more drain holes and water traps, to avoid any risk of water build-up in the total pressure tubing, in case of flight in a water-filled atmosphere (passing through clouds, rainy conditions, etc.). The drain holes make it possible to evacuate any liquid water that penetrates into the Pitot tube.

The nominal operation of the Pitot tube requires reheating in order to avoid any accumulation of ice and to prevent the drain holes from becoming totally or partially blocked, which would be detrimental to their function which is that of discharging water that penetrates in flight or on the ground.

In current aircraft, whether the reheating is functioning properly is checked mainly by monitoring the electric current consumed by each probe. In effect, the reheating is generally done by means of a resistive element embedded in the body of the probe and whose resistivity changes with temperature. A resistive element whose resistance increases with temperature can be chosen. Consequently, if the current consumed by the resistive element is greater than a certain value, then the probe is considered to be working, otherwise the pressure information that it delivers is not taken into account and the probe is considered to be defective. In flight, the reheating means consumes a substantial amount of electrical power, but this is not always necessary.

SUMMARY OF THE INVENTION

The invention aims to match the electrical power consumed by the Pitot tube to the icing conditions encountered. More specifically, this aim is achieved by controlling the local temperature of part of the Pitot tube in order to adjust the reheating power of this part of the Pitot tube depending on the temperature measured for this part.

To this end, the subject of the invention is a probe for measuring the total pressure of a flow, the probe being intended to be fitted in an aircraft, the probe comprising a Pitot tube, means for determining an average temperature of the probe and means for reheating the probe assembly driven by the means for determining the average temperature of the probe, means for determining a local temperature of regions of the Pitot tube likely to accumulate particles conveyed by the flow independently of the means for determining the average temperature of the probe.

Another subject of the invention is a method according to which, if the local temperature delivered by the means for measuring a local temperature of the regions of the Pitot tube likely to accumulate particles conveyed by the flow is less than the first reference temperature, then the additional reheating regions of the Pitot tube likely to accumulate particles conveyed by the flow is triggered until a delivered temperature is reached that is at least equal to a second reference temperature greater than the first reference temperature.

The probe generally comprises a heating resistor making it possible to globally reheat the probe assembly. In some probes, the average temperature is not measured and the reheating power is permanently at maximum. Advantageously, the probe may include means for determining its average temperature. To this end, the resistor may be made of a material whose resistivity varies as a function of its temperature. In its use, it is possible to measure the value of the resistor 22 and thus to determine an average temperature of the probe 10.

Whether or not the average temperature of the probe is measured, the measurement of the local temperature of the regions of the Pitot tube likely to accumulate particles conveyed by the flow is independent of the average temperature of the probe. In practice, even if the action of the heating resistor, making it possible to globally reheat the probe assembly, also makes it possible to vary the temperature of the regions of the Pitot tube likely to accumulate particles conveyed by the flow, factors external to the probe 10 may cause these two temperatures to vary separately from one another. The object of the invention is precisely to distinguish these two temperatures in order to optimize the electrical power consumption of the means for reheating the probe.

BRIEF DESCRIPTION OF THE DRAWINGS

The invention will be better understood and other advantages will become apparent from reading the detailed description of an embodiment given as an example, the description being illustrated by the appended drawing in which.

DETAILED DESCRIPTION

Figure 1:
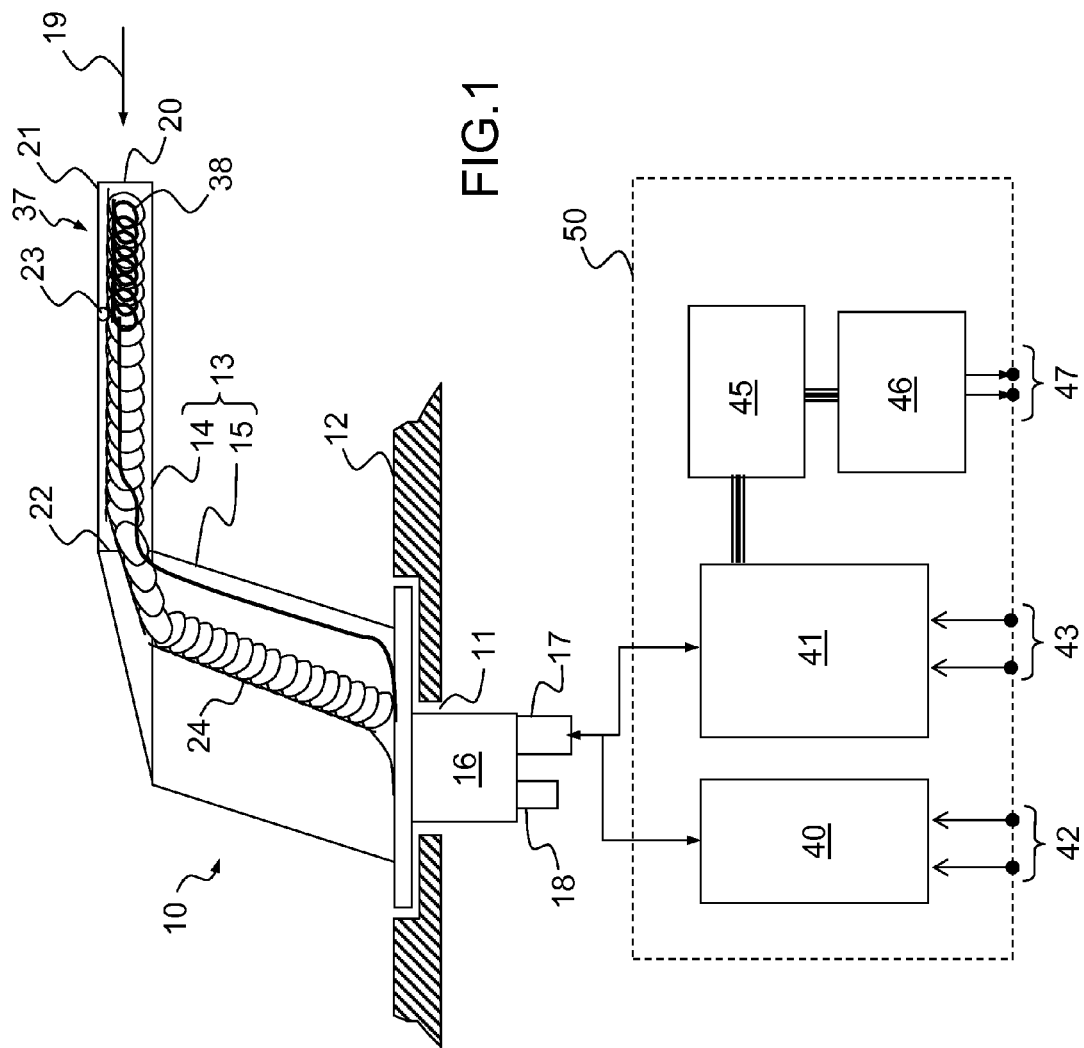
FIG. 1 represents a probe for measuring total pressure according to the invention.

FIG. 1 represents a probe for measuring total pressure 10 intended to be fixed across an opening 11 produced in the skin 12 of an aircraft. The probe 10 comprises a portion 13 external to the skin 12 and formed by a Pitot tube 14 borne by a mast 15. The probe 10 also comprises an internal portion 16 mainly comprising an electrical connector 17 and an air connector 18. The connector 18 allows the Pitot tube 14 to be pneumatically connected to a pressure sensor situated inside the skin 12 of the aircraft. The probe 10 is positioned on the skin 12 of the aircraft so that the Pitot tube 14 is oriented substantially according to a longitudinal axis of the aircraft, outside the boundary layer, so that the direction of flow, represented by an arrow 19, roughly faces an inlet orifice 20 situated at a first end 21 of the Pitot tube 14.

A second end 22 of the Pitot tube 14, opposite the end 21, is closed so as to form a breakpoint in the air stream sampled from the flow and penetrating into the tube 14 through its orifice 20. At the level of the end 22 of the tube, an air jet pipe not represented in FIG. 1 opens in the tube 14 to form therein a pressure tap where the air pressure is to be measured. The jet pipe is, for example, linked to a pressure sensor or to another pressure measuring device. The pressure sensor makes it possible to effectively measure the pressure of the air prevailing inside the tube 14 at its end 22. The pressure sensor may belong to the probe or else be remote from it. In this case, the pressure sensor is connected to the probe 10 by means of the air connector 18.

At the end 22, the tube 14 has one or more drain holes 23 making it possible to discharge particles inside the tube 14. Apart from the drain hole or holes 23, the section is small relative to that of the tube 14, the tube 14 is closed at its end 22. The pressure measured at this end therefore represents the total pressure Pt of the air flow.

In the example represented, the Pitot tube 14 is fixed relative to the skin 12 of the aircraft. It is obviously possible to mount the Pitot tube 14 on a mobile mast, such as, for example, a vane that can be oriented in the axis of the flow, as is described for example in the patent published under the number FR 2 665 539 and filed on Aug. 3, 1990. Thus, when the local incidence of the flow in the vicinity of the probe 10 changes, the orientation of the Pitot tube 14 follows this incidence in order to always face the flow. The total pressure measurement is thereby enhanced on variations of local incidence.

The connector 17 is used to electrically connect the probe 10 to the aircraft, notably to connect the means for reheating the probe assembly 10. These reheating means comprise, for example, a heating resistor 24 that makes it possible to reheat the mast 15 and the Pitot tube 14 over its entire length. The heating resistor 24 may be made of a material whose resistivity varies as a function of its temperature. When it is in use, it is possible to measure the value of the resistance 24 and thus determine an average temperature of the probe 10.

According to the invention, in order to more accurately determine the temperature of a critical area of the probe 10, the latter comprises means for determining a local temperature of a nose 37 of the Pitot tube 14.

Figure 2:
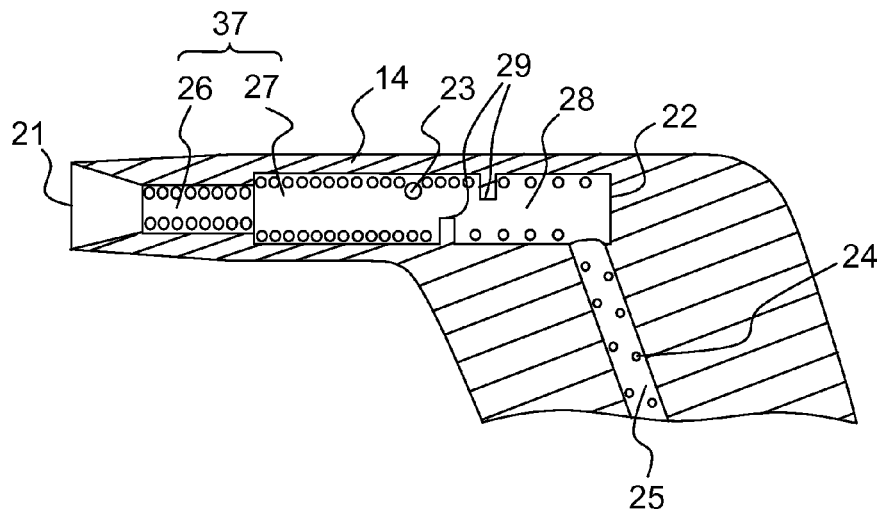
FIGS. 2 and 3 represent exemplary embodiments of a probe for measuring total pressure.

FIG. 2 represents an exemplary embodiment of a probe measuring total pressure comprising a Pitot tube 14 into which an airstream is intended to penetrate through the end 21. At the end 22, a jet pipe 25 forms the pressure tap of the probe. Between the ends 21 and 22, the air penetrating into the tube 14 passes in succession through an inlet channel 26, a water trap 27 and a tranquillization chamber 28 separated from the water trap 27 by a chicane 29 that is used to stop any particles from being able to be penetrated into the tube 14 through the end 21. These particles are discharged from the tube 14 through the drain hole 23. The difference in air pressure between the interior of the tube 14 and the exterior enables the particles present in the water trap 27 to exit from the tube 14 through the drain hole 23.

It is important for the regions of the tube 14 likely to accumulate particles, notably of water, to be maintained at a temperature at which the water does not freeze. In the exemplary embodiment of FIG. 2, these areas comprise for example the inlet channel 26, the water trap 27, and form the nose 37 of the Pitot tube 14. These regions may also be limited to the walls of the drain hole 23.

The invention makes it possible to determine specifically the temperature of these areas, notably to determine whether these areas are likely to ice up.

Figure 3:
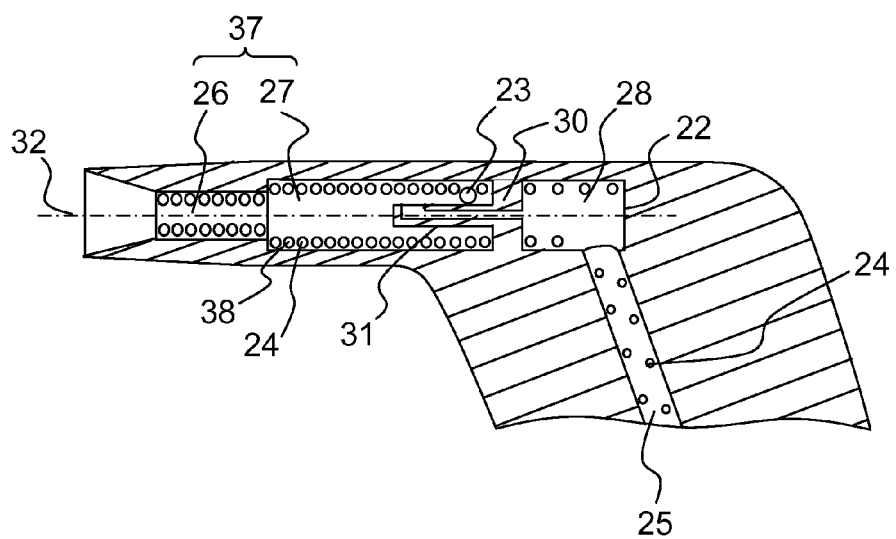

FIG. 3 represents another exemplary embodiment of a probe for measuring total pressure comprising a Pitot tube 14. In this example, there are once again the inlet channel 26, the water trap 27 and the tranquillization chamber 28. The water trap 27 and the tranquillization chamber 28 are in this case separated by a wall 30 that is passed through by a nozzle 31 that is open in the water trap 27 and in the tranquillization chamber 28. To prevent particles from penetrating into the nozzle 31, the latter opens into the water trap 27 perpendicularly to a main axis 32 of the air stream penetrating into the tube 14. The inlet channel 26, the water trap 27 and the tranquillization chamber 28 are, for example, of revolution about the axis 32.

In the rest of the description of the invention, means for determining the local temperature of the nose 37 will more specifically be described. It will of course be understood that these means may be localized in any particular region of the Pitot tube 14 likely to accumulate particles conveyed by the flow, such as the drain hole 23 for example.

To determine the local temperature of the nose 37, it is possible to place, in the nose 37 or immediate proximity thereto, a temperature sensor. However, advantageously, the means for measuring a local temperature are able to locally to reheat the nose 37 of the Pitot tube 14. For this, the probe 10 may comprise a second heating resistor 38 whose resistivity varies as a function of temperature. The resistive element is suitable for use as a temperature sensor and as a reheater complementing the means for reheating the probe assembly. The heating resistor 38 is, for example, formed by a coaxial cable whose core is the actual heating element. The core is electrically insulated for example by means of a mineral insulator which may be welded into a wall forming the Pitot tube 14. The cable is wound in the nose 37 and follows a more linear run in the rest of the probe 10 to the electrical connector 17. In a preferred embodiment, a nickel alloy, or even pure nickel, whose resistance varies greatly with temperature and does so in a relatively linear manner within the temperature ranges of use for a probe 10 fitted in an aircraft, is used for the core. The heating resistors 24 and 38 may be wound in helical form and welded onto the internal walls of the probe 10. Inside the nose 37, it is possible to wind the two heating resistors 24 and 38 one inside the other both following the internal walls of the inlet channel 26 and of the water trap 27.

Alternatively, the resistive element and the means for reheating the probe assembly are formed by a single two-wire coaxial cable. A first wire of the two-wire cable forms the means for reheating the probe assembly and a second wire of the cable forms the resistive element intended to reheat the nose 37. This variant simplifies the manufacturing of the probe 10, while retaining the principle of separation of the means for reheating the probe assembly 10 and those of the nose 37, which makes it possible to optimize the reheating. The second wire is produced in such a way that the value of its resistance is greater at the level of the nose 37 than over the rest of its running in the probe 10 with the first wire.

The probe 10 comprises electronic means 40 for regulating the power supply of the means for reheating the probe assembly 10 and electronic means 41 for regulating the means for reheating the nose 37. Advantageously, the means 40 and 41 are separate. Exemplary embodiments of the means 40 and 41 are, for example, given in the patent applications published under the numbers FR 2 726 148 and FR 2 849 339. The means 40 and 41 both receive an electrical power supply from the aircraft. Advantageously, the power supply intended for the means for reheating the probe assembly 10 and the power supply intended for the means for reheating the nose 37 come from separate circuits of the aircraft. To power the electronic regulation means 40 and 41, the probe 10 includes separate power supply terminals, respectively 42 and 43, intended for connection to separate power supply circuits of the aircraft. In other words, the means for reheating the probe assembly are powered via the power supply terminals 42. The means for measuring a local temperature of the nose 37 are powered via the power supply terminals 43. The terminals 42 and 43 are separate.

The probe may include means for comparing the temperature delivered by the means for measuring the temperature of the nose 37 to a first reference temperature $T_0$ and means for triggering an additional reheating of the nose 37 of the Pitot tube 14. In FIG. 1, these two means are grouped together in the box 45 with the means for measuring the temperature of the nose 37.

The probe may comprise means for generating an alarm when the additional reheating of the nose 37 is triggered. These means may also be grouped together with the other means in the box 45. This alarm allows the pilot to be informed that his aircraft is flying through severe icing conditions.

The subject of the invention is also a method whereby, if the temperature delivered by the means for measuring a local temperature of the nose 37 of the Pitot tube 14 is less than the first reference temperature $T_0$, then an additional reheating of the nose 37 is triggered until a delivered temperature is reached that is at least equal to a second reference temperature $T_1$ greater than the first reference temperature $T_0$. The fact that the reference temperature $T_1$ is greater than the reference temperature $T_0$ makes it possible to avoid numerous and frequent triggerings and stoppages of the reheating of the nose 37 around the temperature $T_0$.

Advantageously, if, after triggering the additional reheating of the nose 37 of the Pitot tube 14, the temperature delivered by the means for measuring a local temperature of the nose 37 of the Pitot tube 14 remains less than the reference temperature $T_0$, then the probe is declared to have failed. It is possible to wait for a given time before declaring the probe 10 to have failed. To this end, the probe 10 includes a module 46 generating a validity indication concerning the probe 10. This indication may take two binary values, one being that the probe 10 is valid and the other when the probe 10 is declared to have failed. The probe 10 includes terminals 47 for transmitting the validity indication to a display of the aircraft, for example situated in the cockpit of the aircraft and available to a Pitot.

The electronic regulation means 40 and 41, the box 45 and the module 46 may be grouped together on an electronic card 50 which may be arranged inside the internal path 16. The terminals 42, 43 and 47 then belong to the electrical connector 17.

The invention claimed is:

1. A probe for measuring the total pressure of a flow, the probe being intended to be fitted in an aircraft, the probe comprising:
    a Pitot tube,
    an average temperature sensor to determine an average temperature of the probe and a reheater of the probe assembly driven by the average temperature sensor, and
    a local temperature sensor to determine a local temperature of particle accumulation regions of the Pitot tube independent of the average temperature sensor.

2. The probe according to claim 1, wherein the particle accumulation regions of the Pitot tube comprise a nose of the Pitot tube, the nose comprising an inlet channel and a water trap.

3. The probe according to claim 1, wherein the particle accumulation regions of the Pitot tube comprise walls of a drain hole allowing particles to be discharged.

4. The probe according to claim 1, wherein the local temperature sensor is configured to locally reheat the particle accumulation regions of the Pitot tube.

5. The probe according to claim 4, wherein the local temperature sensor comprises a heating resistor whose resistivity varies as a function of the temperature, and wherein the heating resistor is suitable for use as a temperature sensor and as a second reheater complementing the reheater of the probe assembly.

6. The probe according to claim 5, wherein the heating resistor is wound in the particle accumulation regions of the Pitot tube.

7. The probe according to claim 6, wherein the heating resistor is formed by a coaxial cable whose core is a heating element and wherein the core is electrically insulated by a mineral insulator.

8. The probe according to claim 6, wherein the heating resistor and the reheater of the probe assembly are formed by a coaxial two-wire cable,
    wherein a first wire of the coaxial two-wire cable forms the reheater of the probe assembly,
    wherein a second wire of the cable forms a resistive element and the second wire has a value of resistance that is greater at the particle accumulation regions of the Pitot tube than over a rest of the probe.

9. The probe according to claim 1, wherein the reheater of the probe assembly is fed through first power supply terminals of the probe, and
    wherein the local temperature sensor to determine the local temperature of the particle accumulation regions of the Pitot tube is fed through second power supply terminals of the probe and in that wherein the first and second terminals are separate.

10. The probe according to claim 1, further comprising a comparator to compare the local temperature delivered by the local temperature sensor of the particle accumulation regions of the Pitot tube to a first reference temperature, and comprising a trigger for triggering additional reheating of the particle accumulation regions of the Pitot tube.

11. The probe according to claim 10, further comprising an alarm configured to switch on when the additional reheating is engaged.

12. Method for implementing the probe according to claim 10, wherein, if the temperature delivered by the local temperature sensor of the particle accumulation regions of the Pitot tube is less than the first reference temperature, then the additional reheating of the particle accumulation regions of the Pitot tube is triggered until a delivered temperature is reached that is at least equal to a second reference temperature greater than the first reference temperature.

13. The method according to claim 10, wherein, if, after triggering the additional reheating of the particle accumulation regions of the Pitot tube, the delivered temperature remains less than the first reference temperature, then a module generates an indication that the probe is declared to have failed.

14. The probe according to claim 1, wherein the particle accumulation regions of the Pitot tube includes a nose of the Pitot tube.

15. The probe according to claim 1, wherein the particle accumulation regions of the Pitot tube includes a drain hole of the Pitot tube.

16. The probe according to claim 8, wherein the second wire is wound in a nose of the Pitot tube and follows a linear run in the rest of the probe.

* * * * *